United States Patent [19]

West et al.

[11] 4,432,866

[45] Feb. 21, 1984

[54] MEMBRANE SEPARATION PROCESS

[75] Inventors: Theodore H. West, Sarnia; John A. Thompson, Wyoming, both of Canada

[73] Assignee: Exxon Research and Engineering Co., Florham Park, N.J.

[21] Appl. No.: 313,465

[22] Filed: Oct. 21, 1981

[51] Int. Cl.³ .......................................... C10G 21/28
[52] U.S. Cl. ................................... 208/321; 208/308
[58] Field of Search ................. 208/308, 321, 311, 33

[56] References Cited

U.S. PATENT DOCUMENTS

| | | | |
|---|---|---|---|
| 2,232,722 | 2/1941 | Parkhurst et al. | 196/13 |
| 2,232,772 | 2/1941 | Crowley et al. | 158/27.4 |
| 2,538,321 | 1/1951 | Wash | 208/311 |
| 2,754,249 | 7/1956 | Myers et al. | 196/14.15 |
| 2,947,687 | 8/1960 | Lee | 208/308 |
| 2,960,462 | 11/1960 | Lee et al. | 208/308 |
| 3,306,849 | 8/1964 | Bozeman, Jr. et al. | 208/321 |
| 3,556,991 | 12/1968 | Gerhold | 208/321 |
| 3,725,257 | 4/1973 | Cavenaghi et al. | 208/331 |
| 3,773,650 | 11/1973 | Hislop et al. | 208/33 |
| 3,985,644 | 10/1976 | Eberly, Jr. | 208/321 |
| 4,115,465 | 9/1978 | Elfert et al. | 208/308 X |

FOREIGN PATENT DOCUMENTS 13834 8/1980 European Pat. Off. .

Primary Examiner—Delbert E. Gantz
Assistant Examiner—Glenn A. Caldarola
Attorney, Agent, or Firm—Edward H. Mazer

[57] ABSTRACT

A method for separating a mixture into a first fraction and a second fraction is disclosed. The method comprises passing the mixture into a decantation zone where the solution is separated into a first fraction relatively rich in a first compound and a second fraction relatively deficient in the first compound. One of the separated fractions subsequently is passed to a membrane separation zone for further purification. The subject invention is of particular utility in petroleum processing, where the solution passed to the decantation zone may be a petroleum processing fraction, such as filtrate from a dewaxing zone or an extract or raffinate from an extraction separation zone.

12 Claims, 1 Drawing Figure

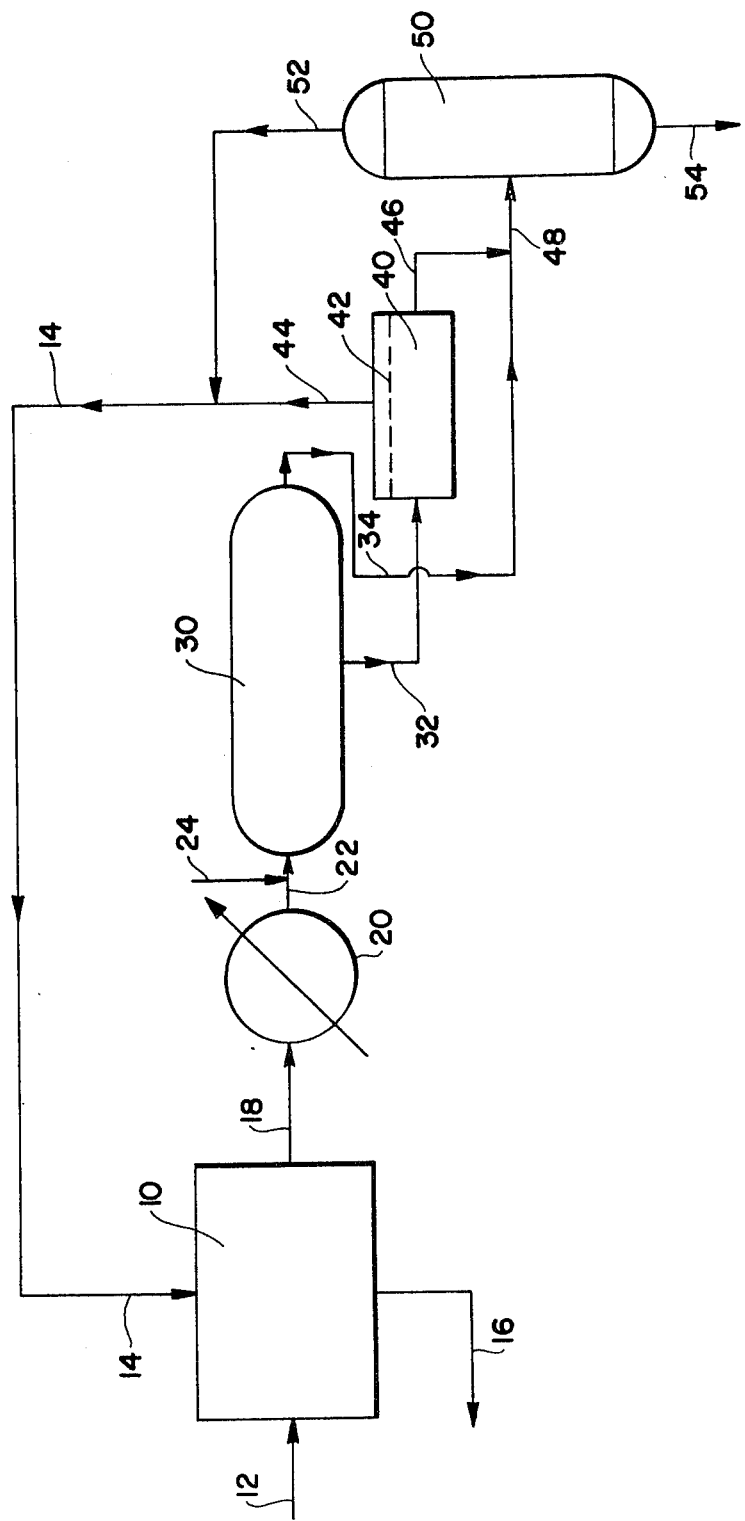

MEMBRANE SEPARATION PROCESS

BACKGROUND OF THE INVENTION

This invention is related to the separation of a mixture into a first fraction relatively rich in a first component and a second fraction relatively rich in a second component. More specifically, this invention is related to the separation of petroleum processing feed streams, especially filtrate, extract or raffinate streams from dewaxing or extraction zones.

In the separation of a mixture, one or more unit operations may be utilized. Frequently, the particular unit operation is selected after a consideration of several variables, including the desired purity of the separated fractions, capital cost of the equipment, equipment reliability and operating costs. In the production of lube oils from base feedstock, the feedstock is processed to remove undesired aromatics and waxy compounds. Typically, these compounds are removed by extractive operations in which a solvent having the desired affinity for one of the feedstock components is passed concurrently, cross-currently or countercurrently to the feedstock to effectuate the separation. For example, in the separation of aromatics from lube oil feedstock, the feedstock may be contacted with a solvent such as phenol, furfural, acetone, and N-methyl pyrrolidone each of which is selectively miscible with the aromatics to be removed. In the separation of waxy compounds, the lube oil feedstock frequently is contacted with a solvent or solvent mixture such as methyl ethyl ketone (MEK) methyl isobutyl ketone (MIBK), methyl ethyl ketone/toluene, or acetone/methylene chloride which selectively removes the waxy compounds. Previously, efforts have been directed at the subsequent processing of the extract and raffinate streams from the extraction zone to separate and recover the solvent, as well as to further purify the lube oil base, which typically comprises the raffinate.

U.S. Pat. No. 2,232,722 is directed at a dewaxing process in which the solution is chilled and decanted to separate the filtrate into two liquid phases for recycle and/or additional processing, such as by distillation, an energy intensive process. Additional solvent may be added to the solution to facilitate the phase separation.

U.S. Pat. Nos. 3,725,257 and 3,985,644 both are directed at the extractive separation of an aromatic-rich stream from a petroleum fraction. The extract then is cooled and separated into an aromatic-rich hydrocarbon phase and a solvent-rich phase. The solvent-rich phase is recycled either to an intermediate point or to the top of the extractor while the hydrocarbon-rich phase is passed to a distillation zone. This process is deficient in that the solvent returned to the extractor contains significant quantities of aromatic hydrocarbons. Thus, recycling this recovered solvent to the top of the extractor will require significantly more solvent for effective removal of aromatics from the aromatic-containing feedstock.

U.S. Pat. No. 2,754,249 also discloses the extraction of a hydrocarbon fraction to remove non-paraffinic compounds. The extract is de-oiled by the addition of a material capable of reducing the solubility of the extracted hydrocarbons in the solvent. The extract subsequently is decanted, with the layer containing solvent and anti-solvent distilled to separate the anti-solvent. The solvent, substantially devoid of anti-solvent, then is mixed with solvent recovered from the raffinate phase and recycled to the extraction system. This process depends upon the use of large amounts of anti-solvent to effect the required separation. Thus, the solvent-rich phase must be distilled to remove large quantities of anti-solvent, resulting in this process being energy intensive.

U.S. Pat. No. 3,556,991 is directed at a method for removing aromatic hydrocarbons from a petroleum fraction by solvent extraction. In this process, the extract is passed through a membrane separation zone having a membrane permeable to the aromatic hydrocarbon but not to the solvent. The retentate solvent then is directed through a distillation zone to further purify the solvent. Although the membrane separation zone removes a fraction of the solvent, significant quantities of the solvent must be removed during the distillation step.

Accordingly, it is desirable to provide a process which is reliable, and offers low operating and maintenance costs.

It is also desirable to provide a process which requires relatively low capital costs and which may be retrofitted to existing separation facilities for improving production rates and/or product quality.

The subject invention is directed at the discovery that decantation and separation of a mixture prior to passage through a membrane separation zone improves the flux and/or degree of separation of the permeate. This procedure thus, may decrease the number of membrane separation zones required for a given throughput and/or reduce the load placed on downstream separation facilities, such as a distillation zone.

SUMMARY OF THE INVENTION

The subject invention is directed at a method for separating a mixture comprising a plurality of compounds into a first fraction relatively rich in a first compound and a second fraction relatively deficient in the first compound. The method comprises the steps of first passing the mixture into a decantation zone wherein the mixture is separated into a first fraction relatively rich in a first compound and a second fraction relatively deficient in the first compound. At least one of the fractions from the decantation zone then is passed into a membrane separation zone wherein the fraction is still further separated into a retentate and a permeate having unequal concentrations of this first compound. Depending upon the particular requirements of the system, the permeate and/or retentate may be recirculated to the extraction and/or dewaxing zone, or it may be further purified as necessary, such as by passing the permeate and/or retentate into a distillation zone. The subject process is applicable to the separation of petroleum fractions, particularly the filtrate, raffinate and/or extract streams from dewaxing or solvent extraction processes. Depending upon the specific composition of the solvent used, it may be advantageous to add an anti-solvent to the filtrate, extract or raffinate to further assist in the separation of the streams in the decantation zone.

BRIEF DESCRIPTION OF THE DRAWING

The FIGURE is a simplified schematic flow drawing of one method for practicing the subject invention.

DETAILED DESCRIPTION OF THE INVENTION

The subject invention may be of utility in any process wherein a mixture of two or more compounds is selectively separated by the use of a semi-permeable membrane, i.e. a membrane which selectively passes only certain of the compounds through the membrane. In the processing of petroleum fractions, particularly lube oil feedstocks, the aromatics and waxy compounds are removed utilizing, in part, dewaxing and solvent extraction techniques well-known in the art.

Referring to the Figure, a conventional separation zone, such as a solvent dewaxing zone 10 is shown. A feedstream 12, such as a hydrocarbon feedstock, is shown entering dewaxing zone 10 while recovered solvent is returned to the dewaxing zone through line 14. Feedstream 12 is separated in dewaxing zone 10 into a wax cake and a solvent/oil mixture by filtration or centrifugation. The wax cake is removed from zone 10 through line 16, while a solvent/oil stream, generally comprising the filtrate exits dewaxing zone 10 through line 18. To facilitate phase separation, the filtrate is cooled prior to and/or during residence in decantation zone 30. In the present embodiment, the filtrate stream passes through a heat removal zone 20, such as a heat exchanger, and exits through line 22. As described more fully hereinafter, an anti-solvent optionally may be added to the filtrate through line 24. The filtrate, with or without anti-solvent, passes into decantation zone 30 where the filtrate is permitted to separate into two layers. A first, solvent-rich layer having reduced amounts of the undesired compounds is removed through line 32, and a second layer relatively rich in the undesired compounds and having a reduced concentration of solvent is removed through line 34. The solvent-rich stream in line 32 passes into a membrane separation zone 40 having a semi-permeable membrane 42 through which, in the process shown, a relatively pure solvent stream passes after which it exits via line 44. The retentate, with a reduced concentration of solvent, passes through line 46. In the process shown, streams 34 and 46 are combined to form stream 48 which passes into a distillation zone 50. Distillation zone 50 separates stream 48 into a relatively pure solvent stream 52 and a relatively concentrated bottoms stream 54 of the undesired compounds. Solvent streams 52 and 44 are combined to form stream 14 which is recycled to dewaxing zone 14 as previously described.

Depending upon the desired purity of the permeate and/or retentate, distillation zone 50 may or may not be required. In instances where the distillation zone is the rate limiting operation, the present invention may permit an increase in the overall production rate without adversely affecting the products from the distillation zone.

The following example illustrates the utility of the subject invention in increasing the flux through the membrane 42. In this example, the solvent comprised a mixture of 25 wt.% acetone and 75 wt. % methylene chloride, which is useful for the solvent extraction of waxy compounds in a dewaxing operation. A typical representative filtrate stream was prepared comprising about 20 wt. % hydrocarbon compounds and about 80 wt. % solvent. This solution was cooled to about $-29°$ C. and allowed to decant for about 5 minutes into an upper, hydrocarbon-rich layer comprising about 40 vol. % waxy hydrocarbons, and about 60 vol. % solvent. The lower, solvent-rich layer comprised about 9 vol. % hydrocarbon and about 91 vol. % solvent. The upper and lower layers each comprised approximately 50 vol. % of the filtrate. The upper layer was removed, and the lower layer was passed through a membrane separation zone 40 having a Spectrapore 3500 semi-permeable membrane using 400 psig pressure. This membrane, manufactured by Spectrum Medical Industries, Los Angeles, Calif., U.S.A. comprised a regenerated cellulose membrane having a pore size of about 15 Å. This membrane was preconditioned for use in the subject process by sequentially permeating the water containing membrane with methanol and then with methyl ethyl ketone. The feed solutions contacted the membrane at 400 psig and ambient temperature. As shown in Table I, removal of the upper hydrocarbon layer enabled the flux rate to increase substantially while simultaneously decreasing the oil concentration in the permeate. Such a system may enable the use of fewer membrane separation units for a given throughput and/or improve the quality of the permeate.

TABLE I

| | Without Decanter | With Decanter |
|---|---|---|
| Solvent system | 25/75 Acetone/MeCl$_2$ | 25/75 Acetone/MeCl$_2$ |
| Oil Concentration in Extract to Membrane Separation Zone, wt. % | 20 | 7 |
| Oil Concentration in Permeate, wt. % | 0.9 | 0.45 |
| Flux Rate l/m$^2$/day | 52 | 79 |

In actual commercial dewaxing operations it is anticipated that membrane separation zone 40 would be maintained at a much lower temperature, such as the $-29°$ C. temperature utilized in the decantation zone 30. While the flux rates would be lower at lower temperatures due to the increased viscosity of the permeate, the relative flux rate and purity of the permeate still would be higher where a decantation zone had been used than it would be for a system at comparable operating conditions in which the decantation zone had not been used.

While this example used a pretreated cellulose membrane, it is clear that other membranes also may be suitable. Similarly, while the present example was directed at the separation of dewaxed oil from lube feedstock, the present invention may be applicable to other systems by the use of semi-permeable membranes of the appropriate pore size and chemical resistance.

Depending on the particular characteristics of the system, it may be desirable to add an anti-solvent to the stream prior to or during its residence in decantation zone 30 to improve the separation of the components between the two layers. To avoid the introduction of additional compounds to the system, the anti-solvent added frequently comprises that solvent in the solvent system having the lower solubility for the compounds to be removed. For example, in dewaxing solvent systems comprising MEK/MIBK, or MEK/toluene, or acetone/methylene chloride, the solvent having the lower solubility for the oil, i.e., MEK or acetone, may be added as the anti-solvent. Also, for example in extraction, water may be added as the anti solvent.

While Table I has been directed at the separation of a solvent-lube oil-wax system, it is clear that the present invention is equally applicable to other systems in which the compounds present are separable using a semi-permeable membrane. Similarly, while the feed to the decantation and/or membrane separation zone in the present example is filtrate from a dewaxing process, it is equally clear that the present invention may be practiced on extract and raffinate streams from an extraction process. The present invention also may be applicable to other separation processes where the feed to the decantation zone is not an effluent stream from an extraction zone.

What is claimed is:

1. A method for separating a lube oil contaminant from a lube oil feedstock containing the contaminant, said method comprising:
   (a) passing the lube oil feedstock and a solvent selectively miscible with the contaminant into a solvent extraction zone wherein at least a portion of the lube oil contaminant is separated from the feedstock by the solvent;
   (b) passing the solvent containing the lube oil contaminant from the extraction zone into a liquid-liquid decantation zone wherein the solvent containing lube oil contaminant is separated into a first liquid fraction relatively rich in the lube oil contaminant and a second liquid fraction relatively deficient in the lube oil contaminant;
   (c) passing first liquid fraction from the decantation zone to a membrane separation zone, wherein the first liquid fraction is still further separated into a retentate relatively rich in the lube oil contaminant, and a permeate relatively deficient in the lube oil contaminant;
   (d) recirculating permeate to the solvent extraction zone without further purification; and
   (e) passing retentate from the membrane separation zone to a distillation zone wherein the retentate is separated into a distillate fraction and a bottoms fraction, distillate being recycled to the solvent extraction zone.

2. A method for separating a feedstock, said method comprising:
   A. passing the feedstock into a separation zone wherein the feedstock is contacted with a liquid to form a separable mixture comprising a plurality of compounds;
   B. passing the mixture into a liquid-liquid decantation zone wherein the mixture is separated into a first liquid fraction relatively rich in a first compound and a second liquid fraction relatively deficient in the first compound;
   C. passing one of the liquid fractions from the decantation zone into a membrane separation zone wherein the fraction is still further separated into a permeate and a retentate having unequal concentrations of the first compound;
   D. passing permeate from the membrane separation zone to the separation zone without further processing; and
   E. passing retentate from the membrane separation zone to a distillation zone wherein the retentate is separated into a distillate fraction and a bottoms fraction, distillate being recycled to the separation zone.

3. The method of claim 2 wherein the first compound comprises a hydrocarbon.

4. The method of claim 3 wherein the first compound is a lube oil contaminant.

5. The method of claim 2 wherein the mixture comprises raffinate from an extraction zone.

6. The method of claim 2 wherein the mixture comprises extract from an extraction and/or dewaxing zone.

7. The method of claim 2 wherein the temperature of the mixture is reduced prior to and/or during the residence of the mixture in the decantation zone.

8. The method of claim 7 wherein an antisolvent is added to the mixture to promote the separation of the mixture into a first fraction and a second fraction in the decantation zone.

9. The method of claim 8 wherein the antisolvent added to the mixture is selected from the class consisting of water, methyl ethyl ketone and acetone.

10. The method of claim 2 wherein the separation zone comprises a solvent extraction zone.

11. The method of claim 2 wherein the separation zone comprises a dewaxing zone.

12. A method for separating a feedstock, said method comprising:
   A. passing the feedstock into a solvent dewaxing zone wherein the feedstock is contacted with solvent to form a separable mixture comprising a plurality of compounds;
   B. passing the mixture into a liquid-liquid decantation zoe wherein the mixture is separated into a first liquid fraction relatively rich in a first compound and a second liquid fraction relatively deficient in the first compound;
   C. passing one of the liquid fractions from the decantation zone into a membrane separation zone adapted to decrease the quantity of the liquid fraction subsequently processed by separating the fraction into a permeate and a retentate having unequal concentrations of the first compound;
   D. passing permeate from the membrane separation zone to the solvent dewaxing zone without further processing; and
   E. passing retentate from the membrane separation zone to a distillation zone wherein the retentate is separated into a distillate fraction and a bottoms fraction, distillate being recycled to the solvent dewaxing zone.

* * * * *